US011087084B2

(12) United States Patent
Bastide et al.

(10) Patent No.: US 11,087,084 B2
(45) Date of Patent: *Aug. 10, 2021

(54) CONFIDENCE MODELS BASED ON ERROR-TO-CORRECTION MAPPING

(71) Applicant: International Business Machines Corporation, Armonk, NY (US)

(72) Inventors: Paul R. Bastide, Boxford, MA (US); Matthew E. Broomhall, Goffstown, NH (US); Robert E. Loredo, North Miami Beach, FL (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/822,420

(22) Filed: Nov. 27, 2017

(65) Prior Publication Data

US 2019/0050386 A1 Feb. 14, 2019

Related U.S. Application Data

(63) Continuation of application No. 15/673,602, filed on Aug. 10, 2017.

(51) Int. Cl.
*G06F 17/00* (2019.01)
*G06N 7/00* (2006.01)
(Continued)

(52) U.S. Cl.
CPC .......... *G06F 40/232* (2020.01); *G06F 40/166* (2020.01); *G06F 40/205* (2020.01);
(Continued)

(58) Field of Classification Search
CPC ........ G06F 17/273; G06F 17/24; G06F 17/27; G06F 40/232; G06F 40/166;
(Continued)

(56) References Cited

U.S. PATENT DOCUMENTS 5,258,909 A 11/1993 Damerau et al.
6,853,993 B2 2/2005 Ortega et al.
(Continued)

FOREIGN PATENT DOCUMENTS

WO WO 02014/117549 A1 8/2014

OTHER PUBLICATIONS

List of IBM Patents or Patent Applications Treated as Related, Nov. 27, 2017, 2 pages.
(Continued)

*Primary Examiner* — Cesar B Paula
*Assistant Examiner* — Carl E Barnes, Jr.
(74) *Attorney, Agent, or Firm* — Stephen R. Tkacs; Stephen J. Walder, Jr.; Reza Sarbakhsh

(57) ABSTRACT

A mechanism is provided in a data processing system comprising at least one processor and at least one memory, the at least one memory comprising instructions which are executed by the at least one processor and configure the processor to implement a document processing system. A spell check confidence component executing within the document processing system records a mapping of misspelled words to corrected words for set of documents. The spell check confidence component generates an error-to-correction frequency model based on the mapping. A parser executing within the document processing system parses an input document to extract words in the error-to-correction frequency model. The spell check confidence component calculates a precision score for each word in the input document found in the error-to-correction frequency model. The precision score represents a probability that the extracted word is spelled correctly as intended in the input document. The document processing system generates a precision model for the input document based on the precision scores. The document processing system performs a
(Continued)

natural language processing operation on the input document based on the confidence model.

10 Claims, 3 Drawing Sheets

(51) Int. Cl.
| | | |
|---|---|---|
| *G06F 40/232* | (2020.01) | |
| *G06N 5/04* | (2006.01) | |
| *G06N 20/00* | (2019.01) | |
| *G06F 40/166* | (2020.01) | |
| *G06F 40/205* | (2020.01) | |
| *G06F 40/40* | (2020.01) | |

(52) U.S. Cl.
CPC ............. *G06N 5/041* (2013.01); *G06N 7/005* (2013.01); *G06N 20/00* (2019.01); *G06F 40/40* (2020.01)

(58) Field of Classification Search
CPC ....... G06F 40/205; G06F 40/40; G06N 20/00; G06N 5/041; G06N 7/005
See application file for complete search history.

(56) References Cited

U.S. PATENT DOCUMENTS

| | | | |
|---|---|---|---|
| 6,918,086 | B2 | 7/2005 | Rogson |
| 7,321,892 | B2 | 1/2008 | Vadon et al. |
| 7,440,941 | B1 | 10/2008 | Borkovsky et al. |
| 7,451,397 | B2 | 11/2008 | Weber et al. |
| 7,647,554 | B2 | 1/2010 | Pickover et al. |
| 7,672,927 | B1 | 3/2010 | Borkovsky et al. |
| 7,814,097 | B2 | 10/2010 | Smith et al. |
| 8,090,669 | B2 | 1/2012 | Shanani et al. |
| 8,201,087 | B2 | 6/2012 | Kay et al. |
| 8,275,803 | B2 | 9/2012 | Brown et al. |
| 8,321,471 | B2* | 11/2012 | Cucerzan ............. G06F 17/273 707/803 |
| 8,868,587 | B1 | 10/2014 | Subramaniam et al. |
| 8,909,516 | B2 | 12/2014 | Medero et al. |
| 8,996,554 | B2 | 3/2015 | Garg et al. |
| 9,002,866 | B1 | 4/2015 | Brunsman et al. |
| 9,275,036 | B2 | 3/2016 | Bodin et al. |
| 9,292,621 | B1* | 3/2016 | Roth ................. G06F 16/90324 |
| 9,305,113 | B2 | 4/2016 | Garg et al. |
| 9,418,066 | B2 | 8/2016 | Bastide et al. |
| 9,465,791 | B2 | 10/2016 | Gail et al. |
| 9,558,187 | B2 | 1/2017 | Bastide et al. |
| 9,703,394 | B2 | 7/2017 | Ouyang et al. |
| 9,747,273 | B2 | 8/2017 | Huang et al. |
| 9,747,274 | B2 | 8/2017 | Huang et al. |
| 10,795,938 | B2 | 10/2020 | Wan et al. |
| 2002/0010726 | A1* | 1/2002 | Rogson ................. G06F 17/273 715/257 |
| 2002/0152204 | A1 | 10/2002 | Ortega et al. |
| 2002/0156816 | A1 | 10/2002 | Kantrowitz et al. |
| 2004/0002994 | A1 | 1/2004 | Brill et al. |
| 2005/0210017 | A1 | 9/2005 | Cucerzan |
| 2005/0210383 | A1 | 9/2005 | Cucerzan et al. |
| 2006/0224586 | A1 | 10/2006 | Pickover et al. |
| 2007/0038615 | A1 | 2/2007 | Vadon et al. |
| 2008/0071763 | A1 | 3/2008 | Ferrenq et al. |
| 2008/0072180 | A1 | 3/2008 | Chevalier et al. |
| 2008/0155398 | A1 | 6/2008 | Bodin et al. |
| 2008/0195940 | A1 | 8/2008 | Gail et al. |
| 2009/0281972 | A1 | 11/2009 | Shahani et al. |
| 2009/0287678 | A1 | 11/2009 | Brown et al. |
| 2011/0066587 | A1 | 3/2011 | Ferrucci et al. |
| 2011/0125734 | A1* | 5/2011 | Duboue ................... G09B 7/00 707/723 |
| 2011/0145219 | A1 | 6/2011 | Cierniak et al. |
| 2012/0078889 | A1* | 3/2012 | Chu-Carroll ...... G06F 17/30654 707/723 |
| 2012/0131015 | A1* | 5/2012 | Al Badrashiny ..... G06F 17/273 707/748 |
| 2012/0276505 | A1* | 11/2012 | Al Badrashiny ..... G06F 17/273 434/167 |
| 2012/0296918 | A1* | 11/2012 | Morris ................ G06F 16/3331 707/748 |
| 2013/0007055 | A1 | 1/2013 | Brown et al. |
| 2013/0018652 | A1 | 1/2013 | Ferrucci et al. |
| 2013/0066886 | A1 | 3/2013 | Bagchi et al. |
| 2013/0151956 | A1 | 6/2013 | Allen |
| 2014/0006012 | A1 | 1/2014 | Zhou et al. |
| 2014/0208230 | A1 | 7/2014 | Stanley |
| 2014/0317495 | A1 | 10/2014 | Lau et al. |
| 2016/0132545 | A1* | 5/2016 | Bodin .................... G06F 17/273 707/609 |
| 2016/0282956 | A1* | 9/2016 | Ouyang ................ G06F 3/0237 |
| 2017/0004204 | A1* | 1/2017 | Bastide .............. G06F 16/3329 |
| 2017/0193056 | A1 | 7/2017 | Mueller |
| 2017/0269708 | A1 | 9/2017 | Ouyang et al. |
| 2018/0188823 | A1 | 7/2018 | Dunne et al. |
| 2018/0188824 | A1 | 7/2018 | Dunne et al. |

OTHER PUBLICATIONS

"Microsoft Excel blamed for gene study errors", http://www.bbc.com/news/technology-37176926, Aug. 25, 2016, 14 pages.

High, Rob, "The Era of Cognitive Systems: An Inside Look at IBM Watson and How it Works", IBM Corporation, Redbooks, Dec. 12, 2012, 16 pages.

McCord, M.C. et al., "Deep parsing in Watson", IBM J. Res. & Dev. vol. 56 No. 3/4 Paper 3, May/Jul. 2012, pp. 3:1-3:15.

Yuan, Michael J., "Watson and healthcare, How natural language processing and semantic search could revolutionize clinical decision support", IBM Corporation, IBM developerWorks, http://www.ibm.com/developerworks/industry/library/ind-watson/, Apr. 12, 2011, 14 pages.

Baldwin, Tyler et al., "Autonomous Self-Assessment of Autocorrections: Exploring Text Message Dialogues", 2012 Conference of the North American Chapter of the Association for Computational Linguistics: Human Language Technologies, Jun. 2012, pp. 710-719.

Zimmer, Ben, "When Spellcheckers Attack: Perils of the Cupertino Effect", Oxford University Press, OUPblog, https://blog.oup.com/207/11/spellchecker, Nov. 2007, 3 pages.

* cited by examiner

… (1)

CONFIDENCE MODELS BASED ON ERROR-TO-CORRECTION MAPPING

BACKGROUND

The present application relates generally to an improved data processing apparatus and method and more specifically to mechanisms for generating confidence models for tabular or word processing data.

In computing, a spell checker (or spell check) is an application program that flags words in a document that may not be spelled correctly. Spell checkers may be stand-alone, capable of operating on a block of text, or as part of a larger application, such as a word processor, email client, electronic dictionary, or search engine.

A basic spell checker carries out the following processes:

It scans the text and extracts the words contained in it.

It then compares each word with a known list of correctly spelled words (i.e. a dictionary). This might contain just a list of words, or it might also contain additional information, such as hyphenation points or lexical and grammatical attributes.

An additional step is a language-dependent algorithm for handling morphology. Even for a lightly inflected language like English, the spell-checker will need to consider different forms of the same word, such as plurals, verbal forms, contractions, and possessives. For many other languages, such as those featuring agglutination and more complex declension and conjugation, this part of the process is more complicated.

As an adjunct to these components, the program's user interface will allow users to approve or reject replacements and modify the program's operation. An alternative type of spell checker uses solely statistical information, such as n-grams, to recognize errors instead of correctly-spelled words. This approach usually requires a lot of effort to obtain sufficient statistical information. Key advantages include needing less runtime storage and the ability to correct errors in words that are not included in a dictionary. In some cases spell checkers use a fixed list of misspellings and suggestions for those misspellings; this less flexible approach is often used in paper-based correction methods, such as the see also entries of encyclopedias. Clustering algorithms have also been used for spell checking combined with phonetic information.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system comprising at least one processor and at least one memory, the at least one memory comprising instructions which are executed by the at least one processor and configure the processor to implement a document processing system which operates to perform the method. The method comprises recording, by a spell check confidence component executing within the document processing system, a mapping of misspelled words to corrected words for set of documents. The method further comprises generating, by the spell check confidence component, an error-to-correction frequency model based on the mapping. The method further comprises parsing, by a parser executing within the document processing system, an input document to extract words in the error-to-correction frequency model. The method further comprises calculating, by the spell check confidence component, a precision score for each word in the input document found in the error-to-correction frequency model. The precision score represents a probability that the extracted word is spelled correctly as intended in the input document. The method further comprises generating, by the document processing system, a precision model for the input document based on the precision scores. The method further comprises performing, by the document processing system, a natural language processing operation on the input document based on the confidence model.

In other illustrative embodiments, a computer program product comprise a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
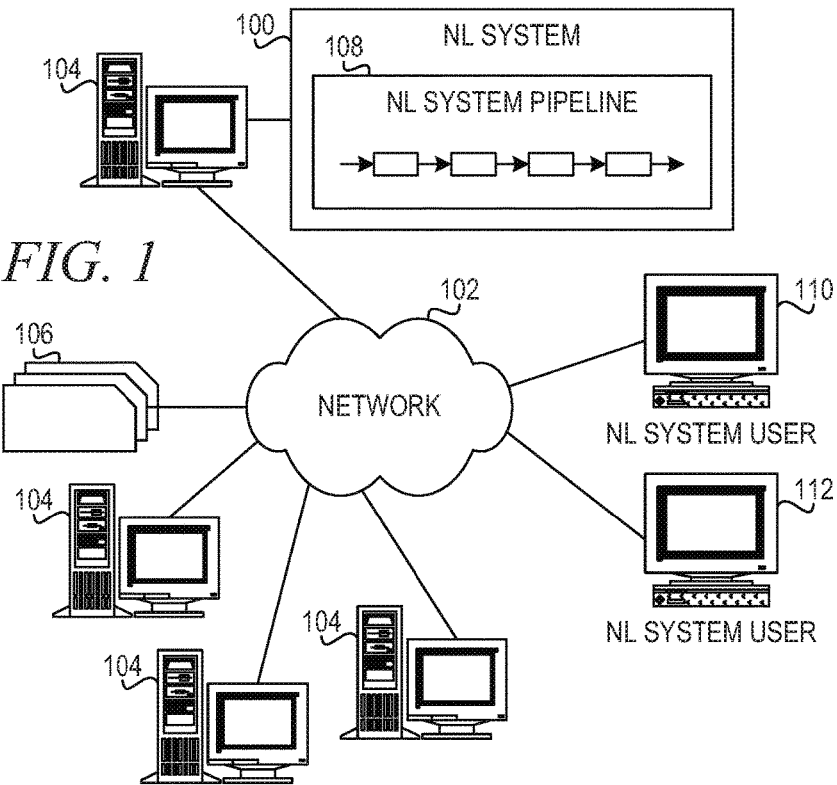
FIG. 1 depicts a schematic diagram of one illustrative embodiment of a natural language processing system in a computer network in which aspects of the illustrative embodiments may be implemented.

The illustrative embodiments provide mechanisms for generating confidence models for tabular or word processing data. Spell checking has revolutionized digital recording and communications. Prior to statistical and natural language evidence used to correct misspelled words, much time was spent reviewing and correcting communications. Users have developed a trust that the spell check of the identified incorrect word is correct, such that the words are autocorrected without review. Automated corrections have led to unintended errors in scientific papers and other documents. The problem is compounded when decisions are made using the extracted facts and data from the improperly corrected documents.

The illustrative embodiments provide a mechanism for generating confidence models for tabular or word processing data in an input document. The mechanism develops confidence models for tabular or word processing data using downstream analysis of the input data. The mechanism records the error-to-correction frequency, analyzes a selection of data for potential error/origin and correction frequencies, develops a precision model of the data within the document, and modifies the data based on the precision model. For instance, the mechanism may identify data for which the confidence is low, modify the identified data, remove the identified data, flag the identified data as being low-confidence, or reweight the data.

In one example embodiment, the mechanism may record error-to-corrections along with the domain of the document. The domain may be genomics, finance, engineering, or architecture, for example.

In another example embodiment, the mechanism may interface directly with a spell checker to receive data about incorrectly spelled words that are identified, words that were automatically corrected, words that were corrected after interaction with a user, and words that were identified but were not corrected after interaction with a user. The mechanism may also examine documents with tracked changes to identify words that were manually corrected by a user.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations, In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
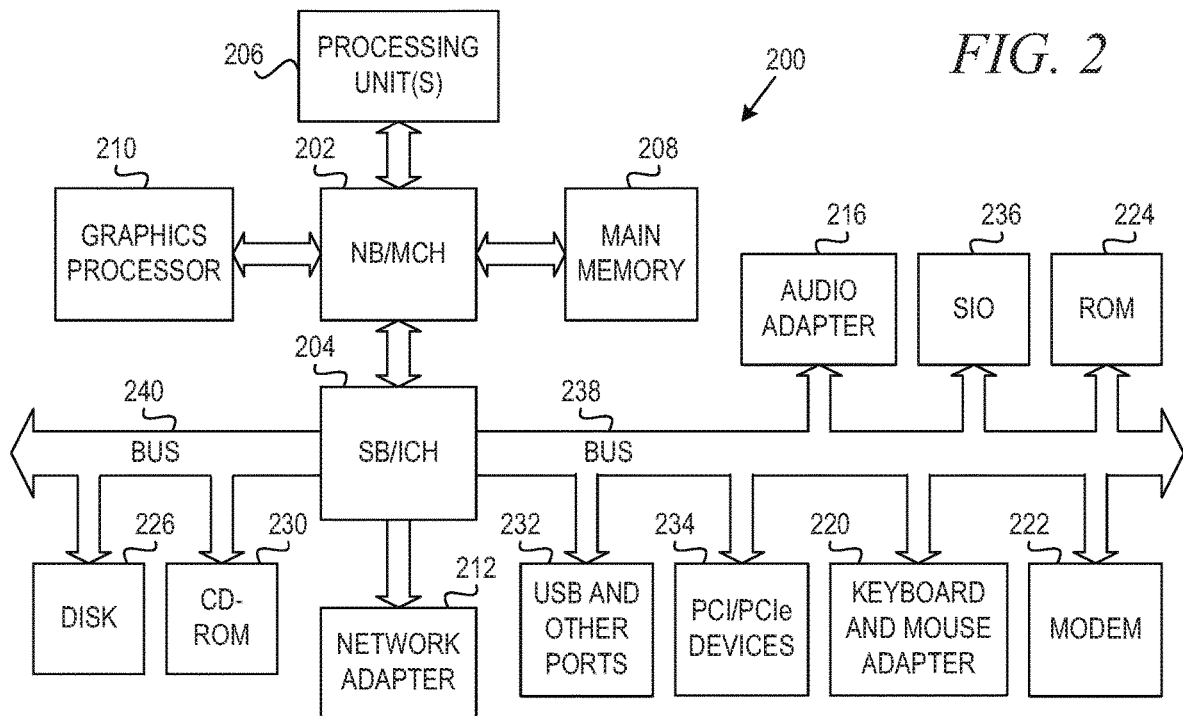
FIG. 2 is an example block diagram of a computing device in which aspects of the illustrative embodiments may be implemented.
Figure 3:
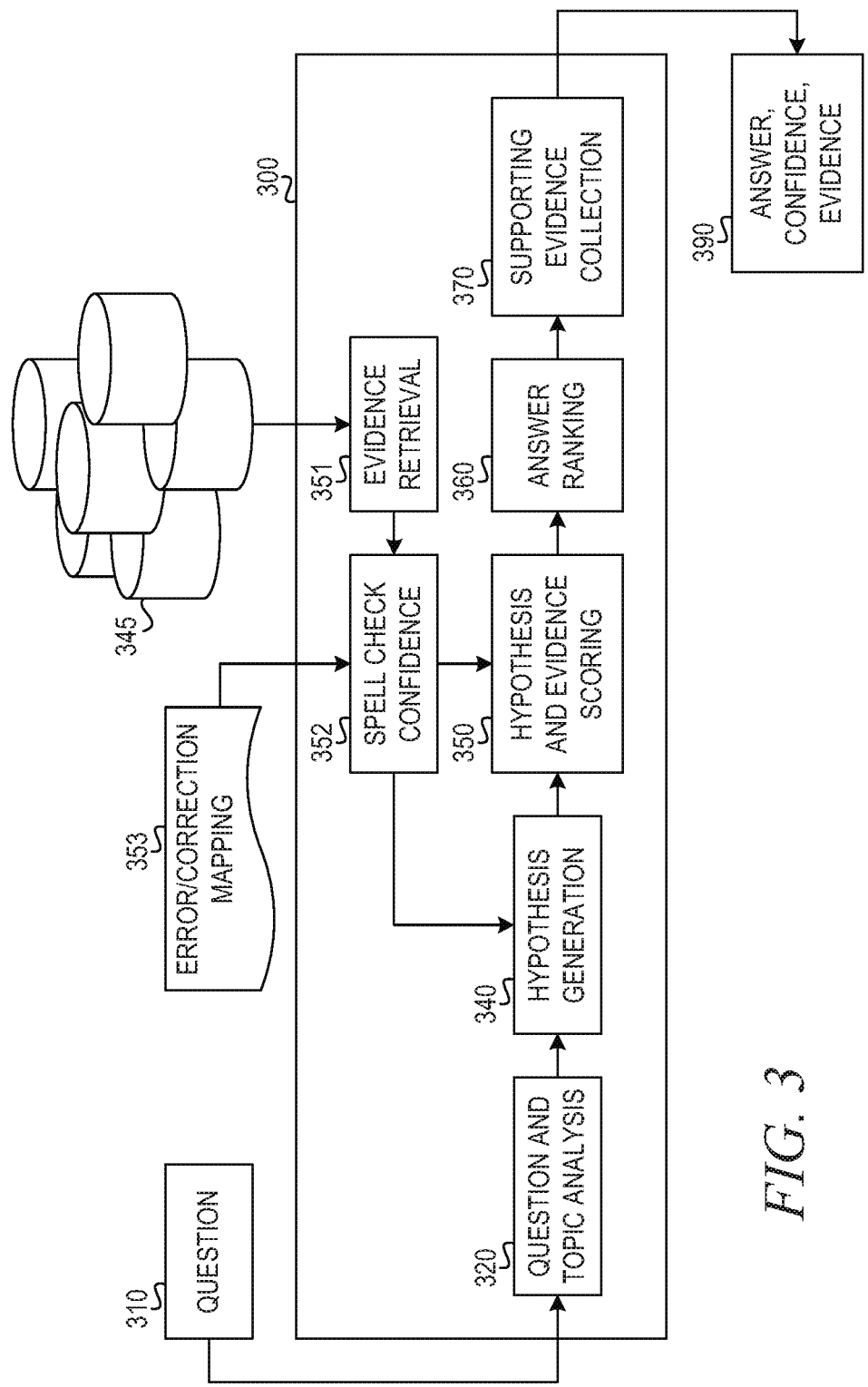
FIG. 3 illustrates a natural language processing system pipeline for processing an input question in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example natural language (NL) processing system, such as a Question Answering (QA) system (also referred to as a Question/Answer system or Question and Answer system), methodology, and computer program product with Which the mechanisms of the illustrative embodiments are implemented. As will be discussed in greater detail hereafter, the illustrative embodiments are integrated in, augment, and extend the functionality of these NL processing mechanisms.

With respect to the example embodiment of a QA system, it is important to first have an understanding of how question answering in a QA system is implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of natural language processing mechanisms with which the illustrative embodiments are implemented. Many modifications to the example NL processing system shown in FIGS. 1-3 may be implemented in various embodiments of the present invention without departing from the spirit and scope of the present invention, As an overview, a Question Answering system (QA system) is an artificial intelligence application executing on data processing hardware that answers questions pertaining to a given subject-matter domain presented in natural language. The QA system receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA system. The document may include any file, text, article, or source of data for use in the QA system. For example, a QA system accesses a body of knowledge about the domain, or subject matter area, e g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to the QA system which then answers the input questions using the content in the corpus of data by evaluating documents, sections of documents, portions of data in the corpus, or the like. When a process evaluates a given section of a document for semantic content, the process can use a variety of conventions to query such document from the QA system, e.g., sending the query to the QA system as a well-formed question which is then interpreted by the QA system and providing a response containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA system receives an input question, analyzes the question to extract the major elements of the question, uses the extracted element to formulate queries, and then applies those queries to the corpus of data. Based on the application of the queries to the corpus of data, the QA system generates a set of hypotheses, or candidate answers to the input question, by looking across the corpus of data for portions of the corpus of data that have some potential for containing a valuable response to the input question. The QA system then performs deep analysis, e.g., English Slot Grammar (ESG) and Predicate Argument Structure (PAS) builder, on the language of the input question and the language used in each of the portions of the corpus of data found during the application of the queries using a variety of scoring algorithms. There may be hundreds or even thousands of scoring algorithms applied, each of which performs different analysis, e.g,, comparisons, natural language analysis, lexical analysis, or the like, and generates a score. For example, some scoring algorithms may look at the matching of terms and synonyms within the language of the input question and the found portions of the corpus of data. Other scoring algorithms may look at temporal or spatial features in the language, while others may evaluate the source of the portion of the corpus of data and evaluate its veracity.

The scores obtained from the various scoring algorithms indicate the extent to which the potential response is likely to be a correct answer to the input question based on the specific area of focus of that scoring algorithm. Each resulting score is then weighted against a statistical model, which is used to compute the confidence that the QA system has regarding the evidence for a candidate answer being the correct answer to the question. This process is repeated for each of the candidate answers until the QA system identifies candidate answers that surface as being significantly stronger than others and thus, generates a final answer, or ranked set of answers, for the input question.

As mentioned above, QA systems and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, etc.). Conventional question answering systems are capable of generating answers based on the corpus of data and the input question, verifying answers to a collection of questions from the corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA system to more quickly and efficiently identify documents containing content related to a specific query. The content may also answer other questions that the content creator did not contemplate that may be useful to content users. The questions and answers may be verified by the content creator to be contained in the content, for a given document. These capabilities contribute to improved accuracy, system performance, machine learning, and confidence of the QA system. Content creators, automated tools, or the like, annotate or otherwise generate metadata for providing information usable by the QA system to identify these question-and-answer attributes of the content.

Operating on such content, the QA system generates answers for input questions using a plurality of intensive analysis mechanisms which evaluate the content to identity the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a natural language processing system 100 in a computer network 102. One example of a question/answer generation which may be used in conjunction with the principles described herein is described in U.S. Patent Application Publication No. 2011/0125734, which is herein incorporated by reference in its entirety. The NL processing system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. In the depicted example, NL processing system 100 and network 102 enables question/answer (QA) generation functionality for one or more QA system users via their respective computing devices 110-112. Other embodiments of the NL processing system 100 may be used with components, systems, sub-systems, and/or devices other than those that are depicted herein.

The NL processing system 100 is configured to implement an NL system pipeline 108 that receive inputs from various sources. For example, the NL processing system 100 receives input from the network 102, a corpus of electronic documents 106, NL system users, and/or other data and other possible sources of input. In one embodiment, some or all of the inputs to the NL processing system 100 are routed through the network 102. The various computing devices 104 on the network 102 include access points for content creators and NL system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the NL processing system 100 may operate in environments of any size, including local and global, e.g., the Internet.

In one embodiment, the content creator creates content in a document of the corpus of data 106 for use as part of a corpus of data with the NL processing system 100. The document includes any file, text, article, or source of data for use in the NL processing system 100. NL system users access the NL processing system 100 via a network connection or an Internet connection to the network 102, and input questions to the NL processing system 100 that are answered by the content in the corpus of data 106. In one embodiment, the questions are formed using natural language. The NL processing system 100 analyzes and interprets the question, and provides a response to the N L system user, e.g., NL processing system user 110, containing one or more answers to the question. In some embodiments, the NL processing system 100 provides a response to users in a ranked list of candidate answers while in other illustrative embodiments, the NL processing system 100 provides a single final answer or a combination of a final answer and ranked listing of other candidate answers.

The NL processing system 100 implements a NL system pipeline 108 which comprises a plurality of stages for processing an input question and the corpus of data 106. The NL processing system pipeline 108 generates answers for the input question based on the processing of the input question and the corpus of data 106. The NL processing system pipeline 108 will be described in greater detail hereafter with regard to FIG. 3.

In some illustrative embodiments, the NL processing system 100 may be the IBM Watson™ QA system available from International Business Machines Corporation of Armonk, N.Y., which is augmented with the mechanisms of the illustrative embodiments described hereafter. As outlined previously, the IBM Watson™ QA system receives an input question which it then analyzes to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The IBM Watson™ QA system then performs deep analysis on the language of the input question and the language used in each of the portions of the corpus of data found during the application of the queries using a variety of scoring algorithms. The scores obtained from the various scoring algorithms are then weighted against a statistical model that summarizes a level of confidence that the IBM Watson™ QA system has regarding the evidence that the potential response, i.e. candidate answer, is inferred by the question. This process is repeated for each of the candidate answers to generate ranked listing of candidate answers which may then be presented to the user that submitted the input question, or from which a final answer is selected and presented to the user. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As noted above, the mechanisms of the illustrative embodiments utilize specifically configured computing devices, or data processing systems, to perform the operations for generating confidence models for tabular or word processing data. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external affects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the mechanism for generating confidence models for tabular or word processing data.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may he a portable computing device that is configured with flash memory to provide non-volatile memory for storing operating system files and/or user-generated data, for example. Essentially, data processing system 200 may be any known or later developed data processing system without architectural limitation.

FIG. 3 illustrates a natural language processing system pipeline for processing an input question in accordance with one illustrative embodiment. The natural language (NL) processing system pipeline of FIG. 3 may be implemented, for example, as NL system pipeline 108 of NL processing system 100 in FIG. 1. It should be appreciated that the stages of the NL processing system pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The NL system pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

In the depicted example, NL system pipeline 300 is implemented in a Question Answering (QA) system. The description that follows refers to the NL system pipeline or the NL system pipeline as a QA system; however, aspects of the illustrative embodiments may be applied to other NL processing systems, such as Web search engines that return semantic passages from a corpus of documents.

As shown in FIG. 3, the NL system pipeline 300 comprises a plurality of stages 310-390 through which the NL system operates to analyze an input question and generate a final response. In an initial question input stage, the NL system receives an input question 310 that is presented in a natural language format. That is, a user inputs, via a user interface, an input question 310 for which the user wishes to obtain an answer, e.g., "Who were Washington's closest advisors?" In response to receiving the input question 310, the next stage of the NL system pipeline 300, i.e. the question and topic analysis stage 320, analyzes the input question using natural language processing (NLP) techniques to extract major elements from the input question, and classify the major elements according to types, e.g., names, dates, or any of a plethora of other defined topics. For example, in the example question above, the term "who"

may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of attention deficit disorder with relatively few side effects?," the focus is "What drug" since if this phrase were replaced with the answer it would generate a true sentence, e.g., the answer "Adderall" can be used to replace the phrase "What drug" to generate the sentence "Adderall has been shown to relieve the symptoms of attention deficit disorder with relatively few side effects." The focus often, but not always, contains the LAT. On the other hand, in many cases it is not possible to infer a meaningful LAT from the focus.

Referring again to FIG. 3, the identified major elements of the question are then used during a hypothesis generation stage 340 to decompose the question into one or more search queries that are applied to the corpora of data/information 345 in order to generate one or more hypotheses. The queries are applied to one or more text indexes storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used in the hypothesis generation stage 340, to generate hypotheses for answering the input question 310. These hypotheses are also referred to herein as "candidate answers" for the input question. For any input question, at this stage 340, there may be hundreds of hypotheses or candidate answers generated that may need to be evaluated, The NL system pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. This involves evidence retrieval 351, which retrieves passages from corpora 345. Spell check confidence component 352 generates a confidence model for a portion of text, such as an evidence passage or a source document, based on a confidence that words within the passage or document were appropriately corrected by a spell check route, engine, or system. If words that were not incorrect were automatically or unintentionally auto-corrected by a spell check system, then the confidence may be represented by a lower value. Conversely, if it is determined that the words in the passage or document are likely to be spelled correctly, the confidence may be represented by a higher value.

Consider an example scenario. A spell check routine detects a paragraph of text and scans the text to find a word that is not in a dictionary and not a proper noun. The spell check processes the following passage:

"Mary, Percy, Lord Byron and John Polidori decided to have a competition to see who could write the best horror story. After thinking for days, Shelley dreamt about a scientist who created life and was horrofied by what he had made; her dream later evolved into the novel's story."

The spell check finds "horrofied" and automatically corrects it, to "horror." The mechanism of the illustrative embodiments creates and records the following mapping: [horrofied-horror]. The mechanism continually sources the spell corrections and any auto-corrections, undos, and fixes. The mechanism store the resulting mappings in a database and uses these mappings to generate an inverse mapping count. For instance, given the mappings [horrofied-horror, 3] and [hornors-horror, 1], horror maps to hornors one time out of four, and horror maps to horrofied three times out of four. The mechanism may also record the times when horror is not automatically corrected. The mechanism stores the counts as an error-to-correction frequency as a secondary model or error/correction mapping 353.

Upon loading a document from a specified corpus 345, spell check confidence component 352 scans the words in the document to identify the potential of each word to be a corrected word. Consider the following document:

"File: The Horrors of Frankenstein

Victor Frankenstein, a cold, horror genius, is angry when his father forbids him to continue his anatomy experiments. He inherits the title of Baron von Frankenstein and the family fortune. He uses the money to enter medical school in Vienna."

Spell check confidence component 352 scans this document for the recorded words, including "horror." The mechanism detects the variability with regard to the word "horror"—[3×horrofied, 1×hornors, 4×not changed]. Spell check confidence component 352 calculates the precision of the word is 4/8 or 50%. Spell check confidence component 352 repeats across all words and develops variability to the precision of the document.

Spell check confidence component 352 builds a precision model for the document. This model may indicate 50% variability for any statement using the word "horror" and, as another example, 10% variability for any statement using the word "money" based on a mapping [1×moneys, 9×correct].

In the case of a cognitive system that provides answers or advice based on a corpus of information, as shown in FIG. 3, spell check confidence component 352 adds a precision value to any answer generated with statements for which a confidence model has been generated. Spell check confidence component 352 may remove phrases with low confidence (i.e., precision) from fact generation by lowering the weight of the included data when considering candidate answers in hypothesis and evidence scoring phase 350.

Hypothesis and evidence scoring phase 350 uses a plurality of scoring algorithms, each performing a separate type of analysis of the language of the input question and/or content of the corpus that provides evidence in support of, or not in support of, the hypothesis. Each scoring algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In general, however, these algorithms look for particular terms, phrases, or patterns of text that are indicative of terms, phrases, or patterns of interest and determine a degree of matching with higher degrees of matching being given relatively higher scores than lower degrees of matching.

For example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may he combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexities may be used to generate scores for candidate answers and evidence without departing from the spirit and scope of the present invention.

In answer ranking stage 360, the scores generated by the various scoring algorithms are synthesized into confidence scores or confidence measures for the various hypotheses. This process involves applying weights to the various scores, where the weights have been determined through training of the statistical model employed by the QA system and/or dynamically updated. For example, the weights for scores generated by algorithms that identify exactly matching terms and synonyms may be set relatively higher than other algorithms that evaluate publication dates for evidence passages.

The weighted scores are processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by answer ranking stage 360, which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers").

Supporting evidence collection phase 370 collects evidence that supports the candidate answers from answer ranking phase 360. From the ranked listing of candidate answers in stage 360 and supporting evidence from supporting evidence collection stage 370, NL system pipeline 300 generates a final answer, confidence score, and evidence, or final set of candidate answers with confidence scores and supporting evidence, and outputs answer, confidence, and evidence 390 to the submitter of the original input question 310 via a graphical user interface or other mechanism for outputting information.

Figure 4:
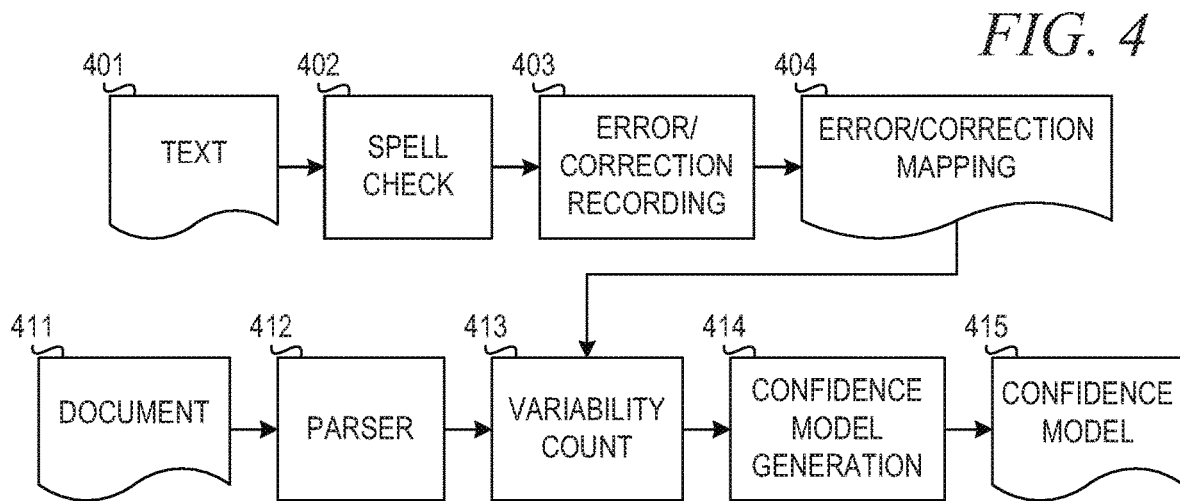
FIG. 4 is a block diagram illustrating a mechanism for generating a confidence model for a document in accordance with an illustrative embodiment.

FIG. 4 is a block diagram illustrating a mechanism for generating a confidence model for a document in accordance with an illustrative embodiment. The mechanism receives an input text 401, which may be a tabular document such as a spreadsheet, a word processing document, or a portion of text from a corpus of information, such as a Wikipedia article, an electronic medical record (EMR), a social media post, or the like. Spell check engine or system 402 receives text 401 and identifies incorrectly spelled words. In one embodiment, spell check 402 compares each word against a dictionary and determines that any word not found in the dictionary is spelled incorrectly. In one embodiment, spell chick 402 suggests corrections or performs automated corrections.

Error/correction recording component 403 records each correction [prior word—corrected word] to form error/correction mapping 404. In one embodiment, error/correction recording component 403 records automated corrections and user-driven corrections. In an example embodiment, error/correction recording component 403 records the corrections in a database. Error/correction recording component 403 may record error-to-correction based on a single author (while authoring, over all documents authored), a set of authors (in a specific domain), everyone (within the system, all authors), crowdsourced (selective modelling of error-to-correction), or a specified time frame.

In one embodiment, error/correction recording component 403 records error-to-corrections along with the domain of the text 401. The domain may be genomics, finance, engineering, architecture, etc. Error/correction recording component 403 may consider all versions of a document—a single version of the document and the related tracked changes. Error/correction recording component 403 may derive the errors and corrections from tracked changes in the text 401.

Parser 412 receives a document 411, which may be a source document or evidence passage for a cognitive system, such as the question answering system as described above or a decision support system. Parser 412 identifies the words in document 411. Variability count component 413 determines a variability count for the words. The variability count represents a number of times a word, either correctly spelled originally or corrected, and all error words mapped to that word occur in the error/correction mapping 404. For example, in the example discussed above, for the word "horror," the error words include "horrofied" and "hornors." Furthermore, the variability count may include the number of times each variation occurs. For example, the word "horrofied" may be corrected to "horror" three times, the word "hornors" may be corrected to "horror" once, and the word "horror" may appear uncorrected four times.

Confidence model generation component 414 maps each word in document 411 to a variability and stores the words in the document along with the variability to form confidence model 415. Confidence model generation component 414 builds confidence model 415 based on the data within document 411 and maintains it along with the parsed data from document 411. For each set of words or passage, confidence model 415 stores a precision or confidence score related to the passage. In the above example, if the word "horror" appears in document 411, then there is a 4/8 or 50% probability that the word uncorrected. Given this probability, confidence model generation component 414 determines a confidence that the word is the intended word. That is, there is a less than 50% chance the word "horror" was unintentionally auto-corrected from a word that was intended to be a word other than "horror."

Confidence model generation component 414 may use machine learning techniques to determine a confidence score for each word in document 411. For example, confidence model generation component 414 may use a machine learning model that is trained using supervised learning and a training set of words and documents. Thus, confidence model generation component 414 may provide a confidence model 415 that provides a confidence score for each word in document 411 with respect to whether a word is correct or appropriately auto-corrected.

In an example embodiment, such a precision or confidence score can he used to weight the passage when determining a confidence score for a candidate answer for which the passage is evidence. As another example, a cognitive system may choose to remove the passage from the document, modify the passage, or flag the passage as having a low confidence score.

In one embodiment, the mechanism uses gazetteers or specialized dictionaries to selectively ignore words or to map important words to preferred forms. In another embodiment, the mechanism uses lemma or normal forms. In yet another embodiment, the mechanism only calculates errors for select words or the important words in a grammar. For example, the mechanism may only do calculations of words in certain styles or fonts to limit calculations on the important parts of a document.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device, Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
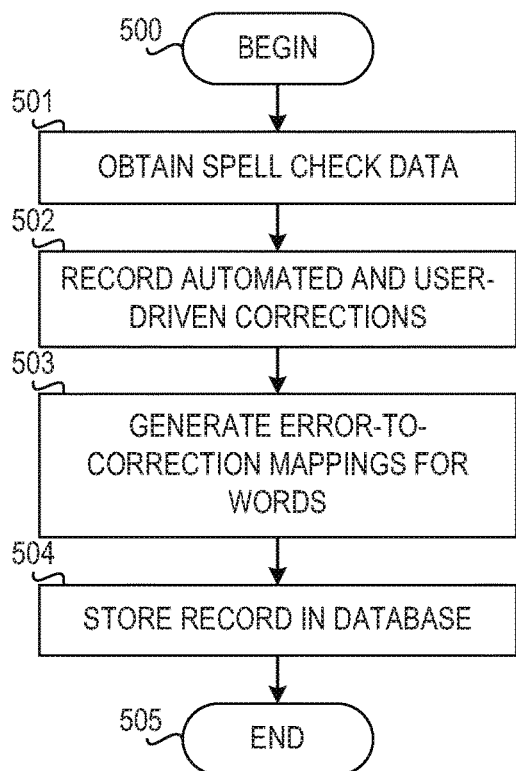
FIG. 5 is a flowchart illustrating operation of a mechanism for generating an error/correction mapping in accordance with an illustrative embodiment.

FIG. 5 is a flowchart illustrating operation of a mechanism for generating an error/correction mapping in accordance with an illustrative embodiment. Operation begins for a received portion of text, such as an evidence passage or source document (block 500). The mechanism obtains spell check data for the text (block 501) and records automated and user-driven corrections for the text (block 502). The mechanism then determines error-to-correction mappings for words (block 503). The mechanism stores the recorded error-to-correction mappings in a database (block 504). Thereafter, operation ends (block 505).

Figure 6:
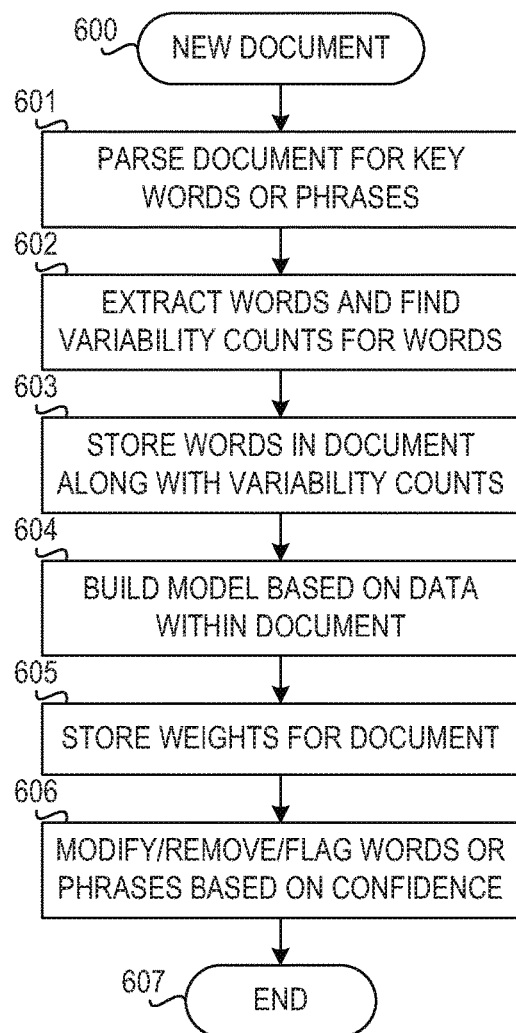
FIG. 6 is a flowchart illustrating operation of a mechanism for generating a confidence model for a document in accordance with an illustrative embodiment.

FIG. 6 is a flowchart illustrating operation of a mechanism for generating a confidence model for a document in accordance with an illustrative embodiment. Operation begins when a new document is detected (block 600). The mechanism parses the document for key words or phrases (block 601). The mechanism extracts words and finds variability counts for words (block 602). The mechanism stores words in the document along with the variability counts (block 603). Then, the mechanism builds a model based on the data within the document (block 604). The mechanism stores weights for the document (block 605). Then, the mechanism modifies, removes, or flags words or phrases based on confidence (block 606). Thereafter, operation ends (block 607).

Thus, the illustrative embodiments provide mechanisms for generating confidence models for documents with respect to probability that words are appropriately auto-corrected by a spell checker. The illustrative embodiments avoid misinterpreting the types of data. The mechanisms reassign data to invalid types and reuse data in formulas and machine learning vectors with confidence. The mechanisms also enhance the use of mobile productivity applications.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions which are executed by the at least one processor and configure the processor to implement a question answering system which operates to perform the method, comprising:

recording, by a spell check confidence component executing within the question answering system, a mapping of misspelled words to corrected words for a set of documents in a database to form an error-to-correction mapping;

parsing, by a parser executing within the question answering system, an input document to extract words in the error-to-correction mapping;

calculating, by the spell check confidence component, a precision score for each word in the input document found as a corrected word in the error-to-correction mapping, wherein for a given word in the input document that was auto-corrected by a spell checker, the precision score represents a probability that the given word was appropriately auto-corrected by the spell checker, wherein calculating the precision score for the given word found as a corrected word in the error-to-correction mapping comprises:

determining a number of times the given word was corrected from a plurality of misspelled words;

determining a number of times the given word was not corrected; and calculating a variability score of the given word based on the number of times the given word was corrected from the plurality of misspelled words and the number of times the given word was not corrected;

generating, by the question answering system, a weight for a passage within the input document containing the given word based on the precision score of the given word; and providing the generated weight to a hypothesis and evidence scoring phase of the question answering system.

2. The method of claim 1, wherein recording the mapping of misspelled words to corrected words comprises recording a mapping of at least one misspelled word corrected by a spell checker to the corrected word.

3. The method of claim 2, wherein recording the mapping of misspelled words to corrected words further comprises recording autocorrect undos and manual fixes.

4. The method of claim 2, wherein recording the mapping of misspelled words to corrected words further comprises generating an inverse mapping count.

5. The method of claim 2, wherein recording the mapping of misspelled words to corrected words comprises recording times when a corrected word appears in a given document correctly and is not autocorrected.

6. The method of claim 1, wherein recording the mapping of misspelled words to corrected words comprises examining tracked changes to at least one document in the set of documents.

7. The method of claim 1, wherein the set of documents comprises all documents, all documents by a single author, all documents in a given domain, or all crowdsourced documents.

8. The method of claim 1, wherein recording the mapping of misspelled words to corrected words is performed over a specified time frame.

9. The method of claim 1, further comprising recording the error-to-correction frequency model in association with a domain of the set of documents.

10. The method of claim 1, further comprising identifying a passage containing words for which the precision score is low and reweighting the identified passage in the hypothesis and evidence scoring phase of the question answering system.

* * * * *